United States Patent [19]

Cantrel

[11] Patent Number: 4,823,893
[45] Date of Patent: Apr. 25, 1989

[54] METAL INSERT MOUNTING

[75] Inventor: James F. Cantrel, Easton, Pa.

[73] Assignee: Ingersoll-Rand Company, Woodcliff Lake, N.J.

[21] Appl. No.: 74,810

[22] Filed: Jul. 17, 1987

[51] Int. Cl.⁴ ............................................. E21B 10/46
[52] U.S. Cl. ..................................... 175/410; 403/361
[58] Field of Search ............... 175/410, 413, 409, 374; 299/91; 403/361; 29/525

[56] References Cited

U.S. PATENT DOCUMENTS

| T970,002 | 5/1978 | Kidder et al. | 175/410 X |
| 3,074,292 | 1/1963 | Polmon | 403/361 X |
| 3,749,190 | 7/1973 | Shipman | 175/410 |
| 4,047,583 | 9/1977 | Dyer | 175/410 |
| 4,289,211 | 9/1981 | Lumen | 175/410 |

FOREIGN PATENT DOCUMENTS 2820642  11/1978  Fed. Rep. of Germany ...... 175/410

Primary Examiner—Hoang C. Dang
Attorney, Agent, or Firm—Walter C. Vliet

[57] ABSTRACT

Hard metal cutters have the attachment portion of their axial length which is cylindrical in cross section, mechanically secured by a transition fit within cylindrical sockets provided in a suitable steel body, such as, for example, a rock drill bit; the cylindrical sockets contain a local circumferential band of deformed and compressed metal axially spanning the innermost cylindrical boundary of the maximum hard metal diameter upon assembly. This eliminates detrimental tensile stresses due to assembly; and provides a region of high compressive stress to reduce the effective fatigue loads during drilling.

4 Claims, 2 Drawing Sheets

METAL INSERT MOUNTING

Prior to this invention, rock drill bits with cylindrical hard metal cutters assembled with transition fits have used various methods to improve fatigue life of the socket. The primary methods illustrated in FIGS. 3 and 4 have had limited success in prevention of transitional fit fracture.

OBJECT OF THE INVENTION

The object of the present invention is to provide an improved method for mounting hard metal inserts in a base.

A further object of the present invention is to provide an economical and secure mounting having maximum fatigue life for inserts such as tungsten carbide compacts in a base metal comprising a rock drill bit or the like.

These and other objects are obtained in an improved socket for mounting carbide inserts and the like in rock drills and the like comprising: An accurately formed cylindrical socket having a bottom and side walls, said socket opening to a surface on said cutting tool, said socket containing a local circumferential band of deformed and compressed metal axially spanning the innermost cylindrical boundary of the maximum insert diameter on assembly, and a method of forming said socket wherein: the band of metal comprises a region of deformed metal having a degree of radial deformation such that the depth of residual compressive stress within the band exceeds that of the adjacent cylindrical side walls; the compressed metal being formed by compacting the local area to create a wall boundary such that a mound of the base metal is generated during the deforming process located radially inward and beyond the primary side wall boundaries, and a region of maximum compressive deformation is formed extending radially outward beyond the primary cylinder wall to a sufficient degree that loss of transition fit occurs in this region after assembly of the hard metal cutter.

DESCRIPTION OF THE PREFERRED EMBODIMENT

Figure 1:
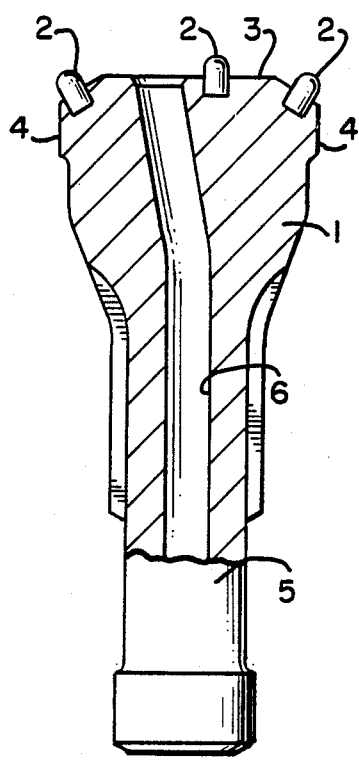
FIG. 1 is a cross sectional view of a typical rock drill bit having hard metal cutter inserts.

Referring to FIG. 1, a rock drilling bit comprising a steel body containing a plurality of hard metal cutters 2 deployed across the drilling face 3 and peripheral gage regions 4 is shown. The bit body contains a suitable attachment means 5 to provide coupling to a rock drilling machine. The bit body also contains internal to external porting 6 for air or drilling fluid passages to facilitate the removal of rock cuttings from the drilled face and subsequently exhausting from the drilled hole.

Figure 2:
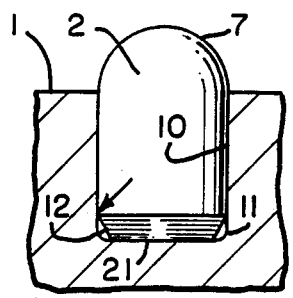
FIG. 2 shows a cross sectional view of a typical cylindrical insert and mounting socket.

FIG. 2 shows the mounting of a typical cylindrical hard metal insert 2 such as a tungsten carbide compact. The insert is typically provided with a domed or semispherical head 7. The inserts are typically installed with an interference fit in a close tolerance flat bottomed cylindrical hold or socket 10 bored in the rock drill bit body. Often, the socket 10 is provided with a radius 11 at its bottom and a relief chamfer 12 is provided correspondingly on the insert. The indicating arrow shows the point of typical failure in both the socket and insert.

Figure 3:
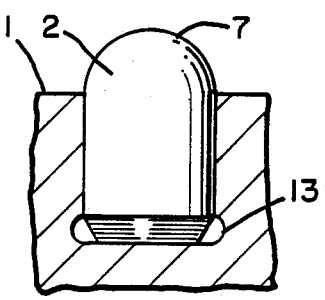
FIG. 3 shows one prior art attempt at solving transitional fracture problems.

FIG. 3 shows one attempt at reducing insert and socket failure where an enlarged undercut radius 13 is provided to eliminate the region of transition fit at the corner of the insert chamfer 12. While generally effective, this method is difficult to accomplish in that the undercut must be precisely located and accurately cut in a blind hole, and socket failures have resulted where this is not accomplished.

Figure 4:
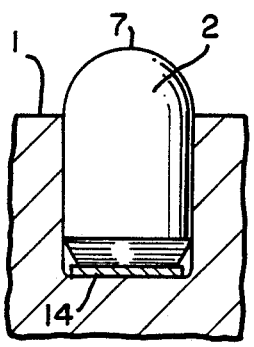
FIG. 4 shows another prior art attempt at solving transitional fracture problem.

FIG. 4 shows yet another attempt at reducing transition fit failure. In this method a relatively soft washer 14, for example copper, is inserted in the socket prior to inserting the insert. In operation, the transition zone is moved as the washer is compressed resulting a increased fatigue life of the socket.

Figure 5:
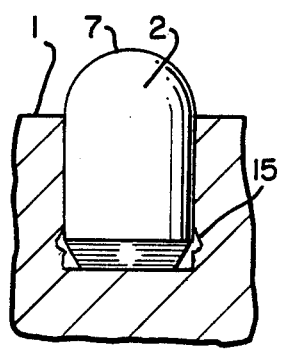
FIG. 5 shows the method of inserts mounting according to the present invention.
Figure 6:
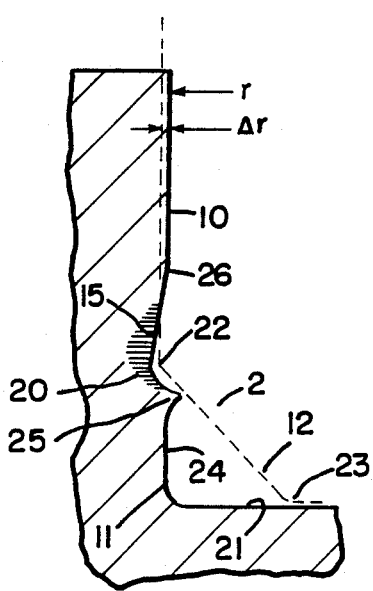
FIG. 6 shows the cross section detail of a mounting socket deformation according to the present invention.

The present invention is shown in FIG. 5 wherein the transition fit zone 15 is cold worked in compression to from a deformation radially outward beyond the primary side wall boundaries. Details of the compressed deformation 20 are shown in FIG. 6. A generally cylindrical socket 10 is formed in the body of a drill bit 1. The bottom 21 of the socket 10 is generally flat with a radius 11 provided at the corner transition.

Shown (in a dotted line) inserted in the socket is an insert 2 made of hard metal such as tungsten carbide. The insert is of slightly larger diameter than the socket resulting in an interference fit. The insert 2 is provided with a larger chamfer 12 which bridges the socket radius 11 at points 22 & 23.

The socket is formed according to the present invention with a generally flat bottom 21 and a corner transition radius 11 as previously described. Extending outward from the radius 11 is a short cylindrical wall zone 24, a zone of positively deformed or displaced material in the form of a ridge or cusp 25 followed by a zone of compressed deformation 20 progressing in a gradual manner to a zone of cylindrical interference fit 26.

Figure 7:
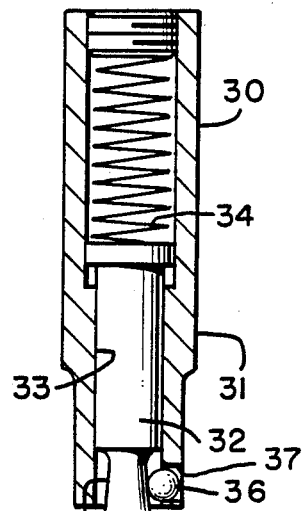
FIG. 7 shows a cross section view of a rolling tool utilized in the method of forming the mounting socket deformation.

FIG. 7 shows the cross sectional view for a roll forming tool 30 suitable for forming the socket of the present invention. The tool 3 is comprised of a tubular casing 31 having a guided plunger 32 inserted in the formed cavity 33 of the casing 31. The plunger 32 is provided with a means 34 for selectively displacing the plunger in an axial direction. The means may typically be a spring 34. At one end of the plunger is an accurate inverse cam 35. The cam 35 radially displaces ball forming members 36 which are disposed in pockets 37 formed in the casing 31 adjacent to and circumferentially about the cam 35. As one skilled in the art may appreciate downward longitudinal displacement of the casing 31 along the plunger 32 as shown in FIG. 8 will radially displace the balls outward and visa versa.

Figure 8:
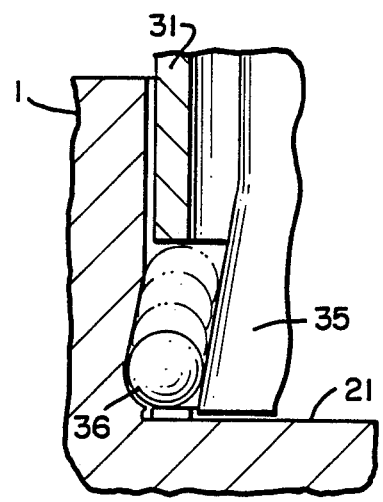
FIG. 8 shows the progressive deformation of the mounting socket according to the present invention utilizing the rolling tool.
Figure 9:
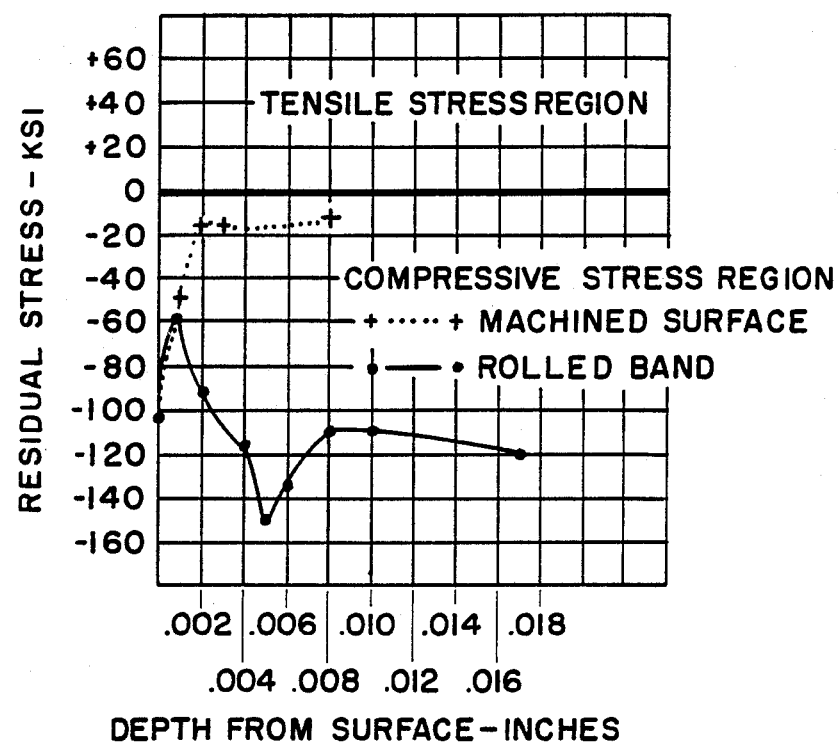
FIG. 9 is a graph showing the residual stress profile in the mounting socket after forming according to the present invention.

In operation as shown on FIG. 8, the roll forming tool 30 is inserted in the cylindrically bored socket of a drill bit. The tool is rotated by appropriate means such as a drill press (not shown). The rolling is done on entry; since the spring keeps the plunger seated, the cam portion would be extended which is not illustrated. In this extended cam position, the balls have freedom in the cam cavity facilitating tool entry into the bit socket. The casing 31 provides the rotation and axial movement of the balls.

When the cam 35 contacts the base of the socket the casing continues downward. This forces the balls over the increasing cam diameter and are thus forced radially outward. The controlled rolling depth is a function of the cam extension. When the cage(casing) contacts the bottom of the socket, no further ball thrust is possible. This results in the formation of the accurate deformation 20 by compression and flow of the base metal of the drill bit and produces residual compressive stresses in the critical transition area. This greatly increases the fatigue life of the socket and additionally removes the sharp transition point on the insert associated with prior art.

In the preferred embodiment shown and described above I have shown the depression caused by the rolling to extend radially outward beyond the dotted carbide insert. While the positive gap at this location when assembled is the best arrangement, I would not like to be limited. If the radial deformation just matched the fit, assembly stress could be zero or even slightly positive with beneficial effect.

Having described my invention, in terms of a preferred embodiment, numerous modifications, in both the formation fixture and the method of obtaining transition will now occur to one skilled in the art and I do not wish to be limited in the scope of my invention except as claimed.

I claim:

1. A cutting tool comprising:
a body of base metal having a surface;
a cylindrical socket formed in said body and extending inwardly from said surface, said socket having a bottom and a cylindrical side wall, said cylindrical side wall having a local circumferential band of deformed and compressed metal axially spaning a portion thereof; and
a hard metal insert mounted in said socket, said hard metal insert having a cylindrical wall surface, a bottom surface and a tapered surface extending longitudinally and inwardly from the cylindrical wall surface to the bottom surface, said local circumferential band of deformed and compressed metal of the cylindrical side wall extending axially from a point above the tapered surface of the hard metal insert to a point below the cylindrical wall surface of the hard metal insert.

2. The cutting tool according to claim 1 wherein: said band of compressed metal comprises a region of deformed metal characterized by the degree of radial deformation being such that residual compressive stresses are formed in said band of deformed and compressed metal such that the depth of residual compressive stress within the band exceeds that of the adjacent portions of the cylindrical side wall; said compressed metal being formed by compacting the local area of the cylindrical side wall to create a wall boundary such that a mound of the base metal is generated during a deforming process located radially inward and beyond the cylindrical side wall, and a region of maximum compression deformation formed to extend radially outward beyond the cylindrical side wall to an extent such that contact between said hard metal insert and said cylindrical side wall is lost in said region.

3. The cutting tool according to claim 2 wherein: said region of maximum compression deformation is formed to extend radially outward beyond the cylindrical wall sufficiently that total loss of transition fit occurs in the region between said hard metal cutter and said cylindrical side wall on assembly.

4. The cutting tool according to claim 2 wherein: said socket is comprised of a cylindrical region having a bottom and cylindrical side wall; a mound region adjacent to said cylindrical region; a region of deformation containing compressive stress adjacent to said mound and a region of cylindrical interference fit extending from said region of deformation towards said surface of said body.

* * * * *